April 18, 1933.  F. H. SCHWERIN  1,904,089
CENTRIFUGAL BRAKE
Original Filed Dec. 5, 1929

INVENTOR
Frank H. Schwerin
BY
ATTORNEY

Patented Apr. 18, 1933

1,904,089

UNITED STATES PATENT OFFICE

FRANK H. SCHWERIN, OF BELLEVUE, PENNSYLVANIA, ASSIGNOR TO THE DUFF-NORTON MANUFACTURING COMPANY, OF PITTSBURGH, PENNSYLVANIA, A CORPORATION OF PENNSYLVANIA

CENTRIFUGAL BRAKE

Original application filed December 5, 1929, Serial No. 411,770. Divided and this application filed November 9, 1931. Serial No. 573,765.

This invention relates to improvements in centrifugal brakes or governors of the type in which a pair of radially movable segmental shoes are slidably secured to a disc to coact with an encircling brake surface.

It is an object of the invention to provide a brake of few parts and compact construction, which is inexpensive to manufacture and easy to assemble. It is also the object to secure a high degree of sensitiveness with durability and freedom from failure.

The specific object of the invention is the provision of a reliable brake or governor, not costly to make, which is well adapted for the safe lowering of heavy loads.

Other objects and advantages will more fully appear in the following description.

In the drawing forming a part hereof:

Figure 1:
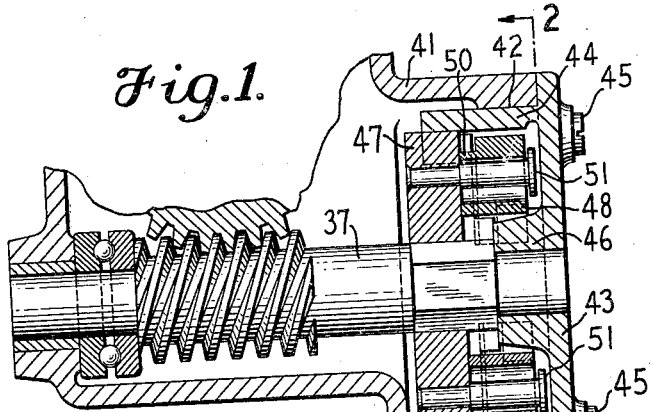
Fig. 1 is a vertical cross-sectional view of the governor applied to a shaft.
Figure 2:
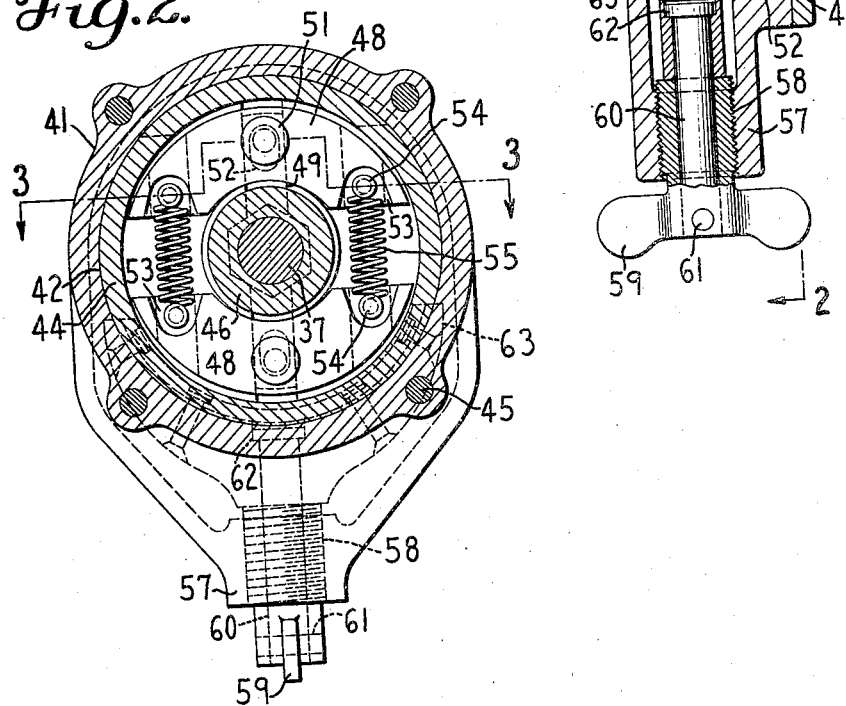
Fig. 2 is a section on the line 2—2 of Fig. 1.
Figure 3:
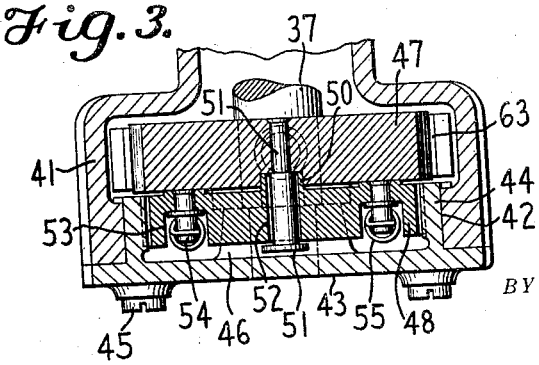
Fig. 3 is a section on the line 3—3 of Fig. 2.

In my Patent No. 1,837,137, dated December 15, 1931, of which this application is a division, the brake now to be described and claimed is shown applied to a shaft of a self-lowering jack. While the brake is particularly adapted to this use, it may be employed for other purposes.

In the form shown, one end of a suitably driven shaft 37 enters a housing 41 having a mouth which is provided with an internal, cylindrical, machined surface 42. The mouth is closed by a cap 43, having an inwardly projecting cylindrical flange 44, machined on the outside to fit the machined surface 42 of the housing, and machined on the inside to cooperate with the governor, as will presently appear. The cap is held in place by screws 45 and has a central boss 46, which affords a bearing for one end of shaft 37.

The portion of the shaft within the chamber 41 is formed polygonally to receive a governor disc 47. Slidably carried on the outer face of the disc are two centrifugal segments 48.

The simple and effective construction provided for slidably securing the brake segments to the disc, to move easily in right lines only, forms an important feature of the invention. It comprises one or more grooves formed in a face of the disc, integral guiding ribs formed on adjacent faces of the segments and pins passing through slots in the segments for retaining the segments on the disc. Reversal of the grooves and ribs as between the segments and the disc is permissible, though it would be less advantageous.

In the preferred form, the outer face of the disc has a diametrical groove 49 and the segments each have an integral central rib 50 guided in the groove. The segments are loosely held to the disc by the heads of pins 51, the shanks of which pass loosely through central slots 52 in the segments and their ribs into the disc, to which the shanks are riveted.

The rib of each shoe fitting the groove and acting against the groove wall serves to take up tangential strains. The shanks of pins 51 pass freely through the slots in the segments and ribs and serve solely to retain the segments on the disc. They are not subjected to the force acting tangentially to the path of movement and, consequently will not become loosened. All possibility of the segments breaking away from the disc or of other damage to the governor is avoided.

The contact surface between the ribs and groove is merely of sufficient area to properly guide the shoes and to serve adequately for the taking up of tangential strain, and there is substantially no friction between the segments and the retaining pins. The general construction is such as to minimize friction, to insure sensitiveness, and to provide a speed governing brake which is practically unaffected by wear and always certain in its action. In a brake of this character, reliability is a primary consideration for such purposes as the safe lowering of railroad cars. Likewise important is the elimination of maintenance expense and of losses due to inability to use the mechanism to which the governor is applied.

The guiding of the segments on the disc or carrier by integral ribs on the one cooperating with grooves in the other contributes not only to maximum strength and durability but also to compactness.

Another feature of the invention resides in the means for normally holding the segments from the wall of the flange.

Recesses 53 are formed in the outer faces of the segments, near their ends, and studs 54 are set into the segments at the backs of the recesses. The opposite ends of two single tension springs 55 are connected to the heads of the studs, within the recesses. Such a pair of floating springs gives a balanced effect. The means of connecting the springs in recesses of the segments causes them to act substantially in a plane with the segments and reduces the thickness of the governor.

A brake, such as described, is adapted to be advantageously used with self-lowering jacks such as that described in my copending application previously referred to. With such jacks a projecting operating shaft receives a ratchet wheel and socketed ratchet case. The compact arrangement of the brake here described avoids the necessity of unduly prolonging the shaft to avoid interference between the governor and operating lever.

When the governor is used with a self-lowering jack, it is desirable to provide the housing 41 with a downward extension 57, the lower end of which is formed with a vertical internally screw-threaded opening, which is engaged by a hollow screw 58. This screw is formed with an external thumb-piece 59, which lies in a protected location beneath the extension 57.

A shaft 60 is pinned at 61 to the outer end of the screw 58, and projects for a distance beyond the inner end of the screw. The inner end of this shaft has a head 62, which retains a manually operated brake segment 63, the shaft being swiveled in the segment. By means of the thumb-piece 59, the brake segment may be set against the periphery of the disc 47, in order to keep the load from descending, or can be freed from the disc to allow the load to lower.

This manually operated brake forms no part of the present invention and is more particularly described and claimed in my prior Patent No. 1,579,788, dated April 6, 1926.

I claim:

1. In a centrifugal brake, a rotary disc, and a brake segment, one of said members being provided with a groove and the other with a guiding rib slidable in the groove to prevent turning of the segment with respect to the disc, and a pin passing through a slot in the segment for retaining the guiding rib in the groove.

2. In a centrifugal brake, a rotary disc having a groove, a pair of segments provided with integral ribs slidable in the groove to prevent turning of the segments with respect to the disc, and a pin passing through a slot in each segment and fixed to the disc for retaining the respective ribs in the groove.

3. In a centrifugal brake, a rotary disc having a diametrical groove in one face, a pair of segments each provided with an integral central rib slidable in said groove for withstanding the tangential braking strain, each segment having a slot, and a headed pin for retaining each segment on the disc, the shank of each pin being fixed to the disc and passing freely through one of said slots so that the pin is not subject to the tangential braking strain.

4. In a centrifugal brake, a rotary disc having a diametrical groove in one face, a pair of segments each having a central integral rib slidable in the groove for withstanding the tangential braking strain, each segment and rib having a central slot extending transversely through the segment and rib, and a headed pin for retaining each segment on the disc, each pin being fixed to the disc and passing freely through one of said slots so that the pin is not subject to the tangential braking strain.

5. A centrifugal brake comprising a rotary disc provided with a groove, a pair of segments each having a rib slidable in the groove, a pin passing through a slot in each segment and fixed to the disc, each segment having a recess at each end, studs mounted in the recesses, and a pair of springs the opposite ends of which are connected in said recess to the said studs.

6. A centrifugal brake comprising a rotary disc having a diametrical groove in one face, a pair of segments each having an integral central rib slidable in the groove for withstanding the tangential braking strain, each segment and rib provided with a central slot passing transversely through the segment and rib, a headed pin passing freely through each slot and fixed to the disc, each segment being provided with a recess at each end, studs mounted in the recesses, and a pair of tension springs connected at opposite ends to the studs.

7. A centrifugal brake, comprising a rotary disc, a pair of segments guided for movement in right lines on the face of said disc, each of said segments being formed with recesses in its outer face, studs fixed in said segments with their heads in said recesses, and a pair of springs connecting said segments with each other, the opposite ends of said springs being connected within said recesses with the heads of said studs.

8. A centrifugal brake comprising a housing in which is an opening; a cap secured to the housing and closing said opening; a shaft in the housing with one end journaled in the cap; a brake surface carried by the cap and extending within the housing substantially parallel and spaced from the shaft; a disc on the shaft; and brake segments carried by the disc and rectilinearly movable, with respect to the disc, into contact with the brake surface.

9. A brake including, in combination, a housing; a rotary shaft within the housing; a brake surface fixed to the housing; a centrifugal brake including a disc carried by the shaft; brake segments carried by the disc, a rib on each brake segment slidable in a groove in the disc so that the brake segments will move by centrifugal force into contact with the brake surface in the housing, said rib and groove preventing the segment from being moved by the tangential braking force; a headed pin extending through a slot in each brake segment and secured to the disc for retaining the rib within the groove; and a manual brake connected with the housing and operable into contact with the disc.

FRANK H. SCHWERIN.